United States Patent [19]

Duffy

[11] Patent Number: 4,745,632
[45] Date of Patent: May 17, 1988

[54] WIRELESS MOBILE TELEPHONE COMMUNICATION SYSTEM

[76] Inventor: Anthony G. Duffy, 9036 Wall St., North Bergen, N.J. 07047

[21] Appl. No.: 814,215

[22] Filed: Dec. 27, 1985

[51] Int. Cl.⁴ ............................................. H04B 1/40
[52] U.S. Cl. ...................................... 379/58; 379/63; 455/54
[58] Field of Search ................. 179/2 E, 2 EA, 2 EB, 179/2 EC; 379/60, 61, 63, 57, 58; 455/54

[56] References Cited

U.S. PATENT DOCUMENTS

| | | |
|---|---|---|
| 3,449,750 | 6/1969 | Sweigert . |
| 3,557,312 | 7/1969 | Vogelman . |
| 3,668,526 | 6/1972 | Raskin .............................. 179/2 EB |
| 3,811,012 | 5/1974 | Barber . |
| 3,919,491 | 9/1973 | Luce . |
| 4,039,760 | 8/1977 | Gregory . |
| 4,101,835 | 7/1978 | Taylor et al. . |
| 4,363,935 | 12/1982 | Toya . |
| 4,456,793 | 6/1984 | Baker ..................................... 379/61 |
| 4,471,168 | 9/1984 | Cripps . |
| 4,558,178 | 12/1985 | Yasuda et al. ...................... 179/2 E |

FOREIGN PATENT DOCUMENTS

| | | | |
|---|---|---|---|
| 1930531 | 12/1970 | Fed. Rep. of Germany ........ 379/61 |
| 53-20704 | 2/1978 | Japan . |
| 56-44232 | 4/1981 | Japan . |
| 5487065 | 6/1981 | Japan . |
| 56-12140 | 6/1981 | Japan . |
| 56-115044 | 10/1981 | Japan . |
| 57-53161 | 3/1982 | Japan . |
| 0204640 | 11/1983 | Japan ..................................... 379/61 |
| 0102033 | 6/1985 | Japan ..................................... 379/61 |

OTHER PUBLICATIONS

Kobayashi et al., "Detachable Mobile Radio Units for the 800 MHz Land Mobile Radio System", 4th IEEE, Vehicular Technology Conference, 5/84, pp. 6-11.

Primary Examiner—Robert Lev
Attorney, Agent, or Firm—Ralph W. Selitto, Jr.

[57] ABSTRACT

A wireless mobile telephone communication system for communicating with a base station is disclosed. The communication system is designed to integrate a conventional wireless telephone unit with a conventional mobile telephone unit to provide remote capabilities. Integration is achieved by an interface which is adapted to acoustically or otherwise couple a wired handset of the mobile telephone unit to a remote wireless handset through a wireless transceiver/control unit. The communication system allows the driver of a mobile telephone equipped vehicle to use a low cost wireless telephone unit to receive calls while away from the unattended vehicle using the remote wireless handset.

16 Claims, 4 Drawing Sheets

WIRELESS MOBILE TELEPHONE COMMUNICATION SYSTEM

BACKGROUND OF THE INVENTION

The present invention relates in general to a wireless mobile telephone communication system, and more particularly, to an interface operative for coupling a wireless telephone unit to a mobile telephone unit, for example, of the cellular type, to provide the user with the capability of establishing two-way communications with a base station through the mobile telephone unit when using the wireless telephone unit at a location remote from the mobile telephone unit. Still more particularly, the present invention relates to a conventional wireless telephone unit having a wireless handset coupled to a conventional cellular mobile telephone unit through an interface so as to provide the user with the freedom to establish two-way communications with the base station independent of the user's proximity to the mobile telephone unit.

Mobile telephone units have become increasingly popular for both business and personal use. To this end, mobile telephone units have been installed in cars, limousines, trucks, boats and even farming equipment such as tractors and the like. One disadvantage of the mobile telephone unit is the provision of a wired handset which necessitates that the user remain within the vehicle for communicating with a base station, i.e., to establish two-way communications by transmitting and receiving incoming and outgoing telephone calls.

Often, the need arises for the user to leave the vehicle unattended, while at the same time, being reachable at the time of an incoming telephone call to the mobile telephone unit. To this end, there is known from U.S. Pat. No. 3,811,012 and Japanese Patent Publication Nos. 57-53161 and 56-12141 a paging system adapted for such purpose. The user, upon leaving the proximity of the mobile telephone unit, carries a paging unit which beeps or provides such other indication that a telephone call has been received by the mobile telephone unit. Upon being paged, the user must retreat from his present position to the mobile telephone unit in order to receive the incoming telephone call. In order to avoid this disadvantage, there is known from Japanese Patent Publication No. 56-44232 a remote paging unit which relays to the caller a telephone number of a local telephone where the user is remotely situated. This known system, however, has little utility when the user is in an area where access to a local telephone is not possible. Accordingly, it can be appreciated that there is an unsolved need for a wireless mobile telephone communication system which allows the user to communicate with the base station independent of the user's proximity to the mobile telephone unit or a local telephone.

SUMMARY OF THE INVENTION

It is broadly an object of the present invention to provide a wireless mobile telephone communication system which overcomes or avoids one or more of the foregoing disadvantages resulting from the use of the above-mentioned known mobile telephone units and paging systems, and which fulfills the requirements of such a system adapted for interfacing a conventional wireless telephone unit with a conventional mobile telephone unit to permit two-way communications with a base station. Specifically, it is within the contemplation of one aspect of the present invention to provide a wireless mobile telephone communication system which utilizes a wireless handset of a conventional wireless telephone unit for communicating with a base station through a conventional mobile telephone unit by means of an acoustically coupled interface.

Another object of the present invention is to provide a wireless mobile telephone communication system which interfaces a conventional wireless telephone unit and a mobile telephone unit without the necessity of having to make modifications to such units.

Another object of the present invention is to provide a wireless mobile telephone communication system which is inexpensive in construction and simple to install.

Another object of the present invention is to provide a wireless mobile telephone communication system which maintains the quality of received and transmitted communication signals.

Another object of the present invention is to provide a wireless mobile telephone communication system which can be retrofitted to existing mobile telephone units, for example, of the cellular type.

In accordance with one object of the present invention, there is disclosed an interface for establishing communications between a wireless telephone unit and a mobile telephone unit. The interface is constructed of first means for establishing two-way communications with the mobile telephone unit, and second means for coupling the wireless telephone unit to the first means whereby communication signals are alternately transmitted and received between the mobile telephone unit and the wireless telephone unit.

In accordance with another embodiment of the present invention, there is a disclosed a wireless telephone communication system for communicating with a base station through a mobile telephone unit. The system is constructed of a mobile transceiver for transmitting and receiving communication signals between the base station, the wireless telephone communication system comprising first means for transmitting communication signals to and receiving communication signals from the base station through the mobile telephone unit, and interface means for coupling the first means to the mobile transceiver, whereby the first means is operative at a location remote from the mobile transceiver for establishing two-way communications with the base station.

In accordance with another embodiment of the present invention, there is disclosed a wireless mobile telephone communication system for communicating with a base station. The system is constructed of a mobile telephone unit having a mobile transceiver for transmitting and receiving communication signals between a wired telephone handset and the base station, first means for transmitting communication signals to and receiving communication signals from the base station through the mobile telephone unit, transceiver means for transmitting and receiving communication signals between the first means and the mobile telephone unit, and interface means for coupling the transceiver means to the mobile telephone unit, whereby the first means when at a location remote from the transceiver means is operative for communicating with the base station through the mobile telephone unit.

In accordance with another embodiment of the present invention, there is disclosed a wireless mobile telephone communication system for communicating with a base station. The system is constructed of a first transceiver means for transmitting communication signals to and receiving communication signals from the base station, wired means for communicating the communication signals to the first transceiver, wireless means for transmitting and receiving the communication signals, second transceiver means for transmitting and receiving the communication signals between the wireless means and the wired means, and interface means for coupling the first transceiver means through the the wired means to the second transceiver means, whereby the wireless means is operative for establishing two-way communication with the base station.

BRIEF DESCRIPTION OF THE DRAWINGS

The above description, as well as further objects, features and advantages of the present invention will be more fully understood by reference to the following detailed description of a presently preferred, but nonetheless illustrative, wireless mobile telephone communication system, in accordance with the present invention, when taken in conjunction with the accompanying drawings, wherein.

DETAILED DESCRIPTION

Figure 1:
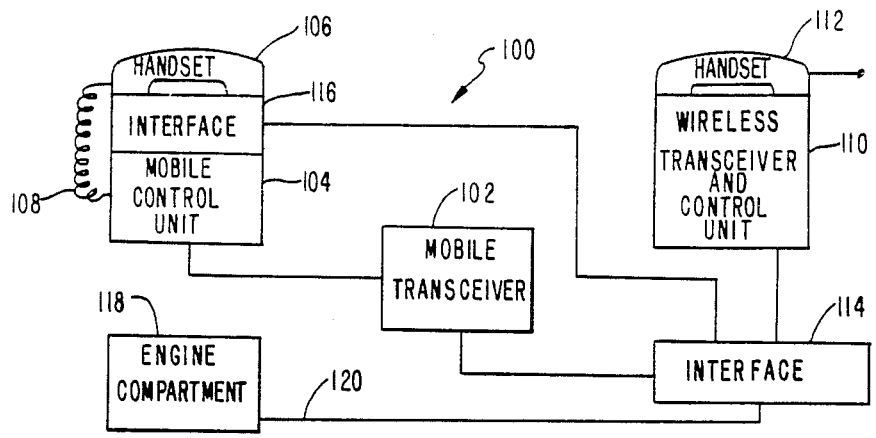
FIG. 1 is a block diagram of the wireless mobile telephone communication system of the present invention showing a conventional wireless telephone unit interfaced with a conventional mobile telephone unit.

Referring now to the drawings, wherein like reference numerals represent like elements, there is shown in FIG. 1 a wireless mobile telephone communication system generally designated by reference numeral 100. The system 100 is constructed of a conventional mobile telephone unit having a mobile transceiver 102 connected to a mobile control unit 104. A wired handset 106 is attached to the mobile control unit 104 via cable 108. A conventional wireless telephone unit, having a wireless transceiver/control unit 110 and a wireless handset 112, is coupled to the mobile telephone unit by interfaces 114, 116. Interface 114, upon activation of the wireless handset 112, is operative for coupling the wireless transceiver/control unit 110 to the mobile transceiver 102 through the acoustic coupling of interface 116 to the wired handset 106. Power and other control signals needed for operation of the system 100 are supplied from the engine compartment 118 to the interface 114 via cable 120.

The mobile telephone unit may comprise any of the well-known units commercially available and intended for mobile operation. For example, one such mobile telephone unit of the cellular type is Model RZ4194 obtained from OKI Cellular Phone Corporation of Hackensack, New Jersey. Similarly, the wireless telephone unit may comprise any of the well-known commercially available units which are intended for wireless operation. For example, one such unit is Model EX-3800 obtainable from Uniden Corporation of Indianapolis, Ind. As such, conventional mobile telephone units and conventional wireless telephone units may be readily integrated into the system 100 without the need for modifications thereto. Specifically, by utilizing interfaces 114, 116, conventional wireless telephone units may be retrofitted onto conventional mobile telephone units which are already in operation.

Figure 2:
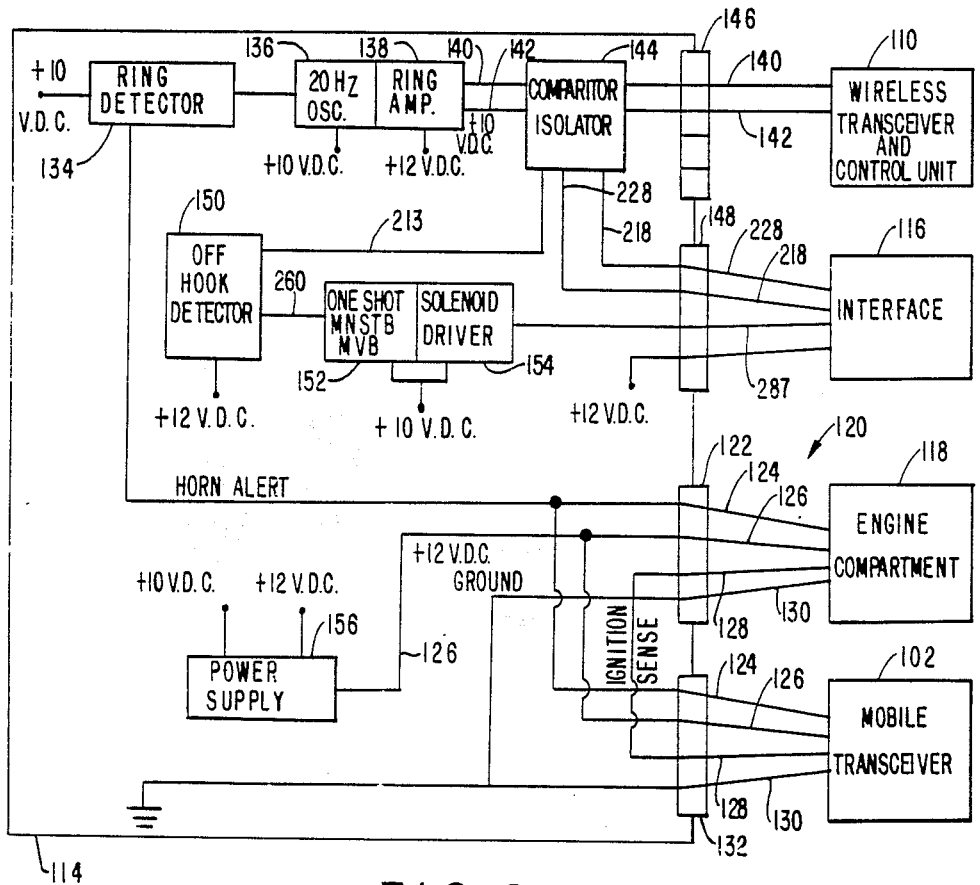
FIG. 2 is a block diagram showing, in greater detail, one interface as shown in FIG. 1.

In installing the system 100, as shown in FIG. 2, a four wire cable 120 extending from the engine compartment 118 is connected to the interface 114 by means of a connector 122. The four wire cable 120 includes a horn alert wire 124, a +12 volt D.C. power supply wire 126, an ignition sense wire 128 and a ground wire 130. Each of these wires 124, 126, 128, 130 are looped through the interface 114 and connected to the mobile transceiver 102 by means of a connector 132. The horn alert wire 124 is connected to a ring detector 134 whose output is connected to a 20 Hz oscillator 136 and a ring amplifier 138. The output of the ring amplifier 138 is applied along wires 140, 142 to a comparator isolator 144, which in turn is connected to the wireless transceiver/control unit 110 via connector 146 and to the interface 116 via connector 148. The comparator isolator 144 is further connected to an off-hook detector 150, whose output is connected to a one shot or monostable multivibrator 152 and solenoid driver 154. The output of the solenoid driver 154 is connected to the interface 116 via connector 148. Power to the interface 114 is supplied by power supply 156 attached to the power supply wire 126.

Figure 4:
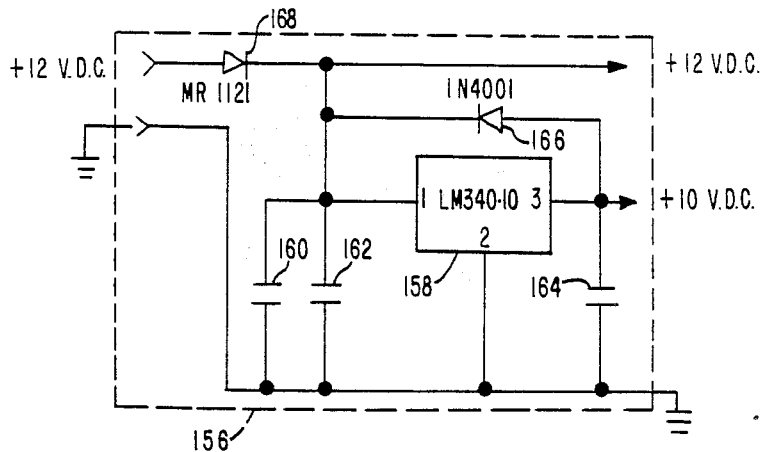
FIG. 4 is a circuit diagram of the power supply as shown in FIG. 2.

As shown in FIG. 4, the power supply 156 is designed around a +10 volts D.C. regulator 158 provided with an interface circuit constructed of a high frequency bypass filter capacitor 160, a noise filter capacitor 162, a ripple filter capacitor 164, a surge protection diode 166, and an isolation and reverse polarity protection diode 168. The power supply 156 provides a +10 and +12 volts D.C. output.

Figure 5:
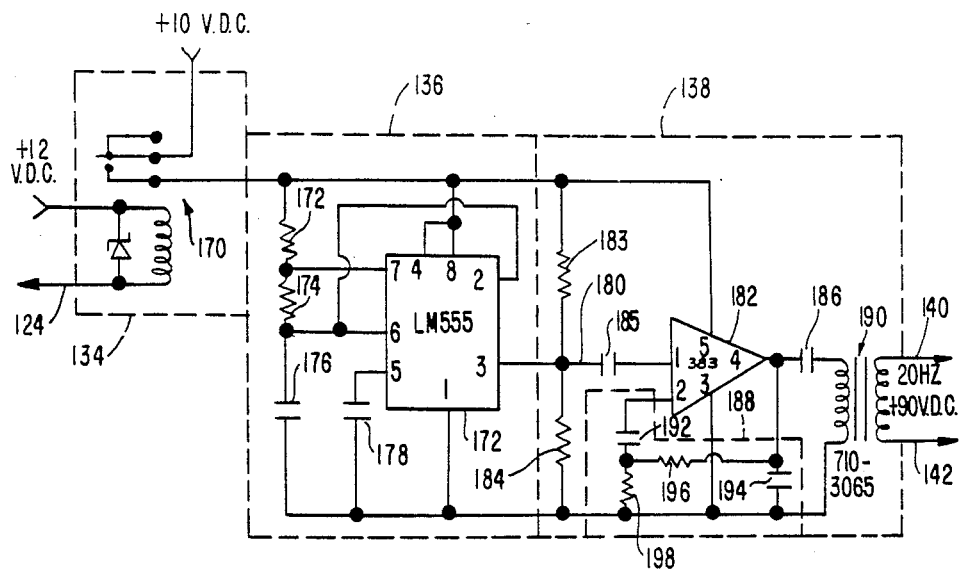
FIG. 5 is a circuit diagram of the ring detector, oscillator and ring amplifier as shown in FIG. 2.

Referring now to FIG. 5, the ring detector 134 is constructed of a +12 volt D.C. relay 170 operative upon activation by the presence of a horn alert signal for applying +10 volts D.C. to the input of the 20 Hz oscillator 136. The oscillator 136 is designed around a universal timer oscillator chip 172 for producing a 20 Hz output. The interface circuit for the oscillator 136 is constructed of a pair of timing resistors 172, 174 and a pair of timing capacitors 176, 178. The 20 Hz output of the oscillator 136 is applied along output wire 180 to the input of the ring amplifier 138. The ring amplifier 138 is designed around an audio amplifier 182 having an interface circuit constructed of a pull-up resistor 183, a load matching resistor 184, input and output isolation capacitors 185, 186, a feed back circuit 188 and a step-up impedance matching transformer 190. The feed back circuit 188 limits the gain of the audio amplifier 182 and is constructed of a pair of capacitors 192, 194 and a pair of resistors 196, 198. The output from the ring amplifier 138, comprising a 20 Hz, +90 volts D.C. signal from the transformer 190, is applied to the comparator isolator 144 along wires 140, 142.

Figure 6:
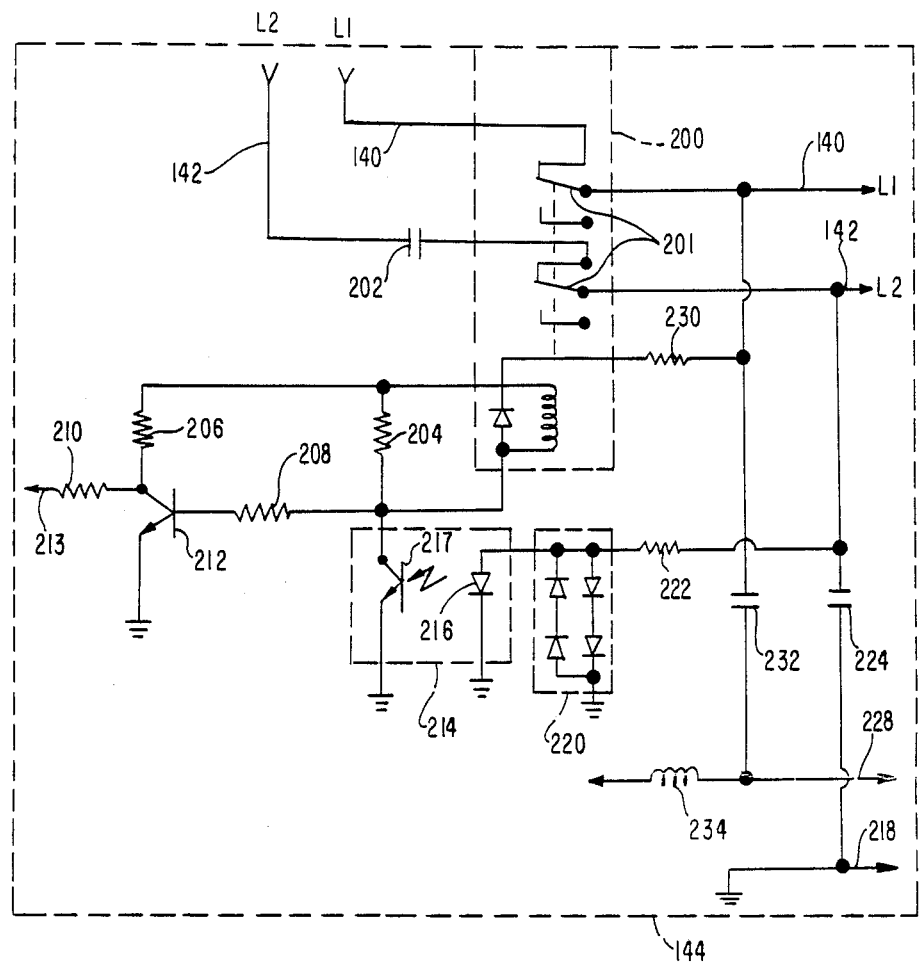
FIG. 6 is a circuit diagram of the comparator isolator as shown in FIG. 2.

Referring now to FIG. 6, the comparator isolator 144 receives the 20 Hz +90 volts D.C. output signal from the ring amplifier 138 which is applied to a +12 volts D.C. relay 200 having switches 201 with wire 142 being connected through a D.C. blocking diode 202. The comparator isolator 144 further includes a pair of load resistors 204, 206 and a pair of bias resistors 208, 210 in operative association with a switching transistor 212 connected to the relay 200. The collector of the switching transistor 212 is connected to the off-hook detector 150 through bias resistor 210 along wire 213. An opto-isolator circuit 214 includes a light emitting diode 216 arranged adjacent the base of an opto-coupled switching transistor 217. The diode 216 is connected to one grounded output wire 218 of the comparator isolator 144 through a diode protection circuit 220, a voltage divider resistor 222 and a D.C. blocking capacitor 224. The emitter of the switching transistor 217 is connected to another output wire 228 of the comparator isolator 144 through a portion of the relay 200, a voltage divider resistor 230 and a D.C. blocking capacitor 232. A coil 234 is connected between the output wire 228 and a +12 volt D.C. supply to allow voice modulation on the D.C. voltage. By operation of the relay 200 and opto-isolator circuit 214, the output signal from the ring amplifier 138 is applied to the wireless transceiver/control unit 110 along wires 140, 142 or the wireless transceiver/control unit is coupled directly to the interface 116 via output wires 218, 228. In this regard, the output wires 140, 142 from the interface 114 to the wireless transceiver/control unit 110 are the conventional L1 and L2 wires of the unmodified wireless telephone unit.

Figure 7:
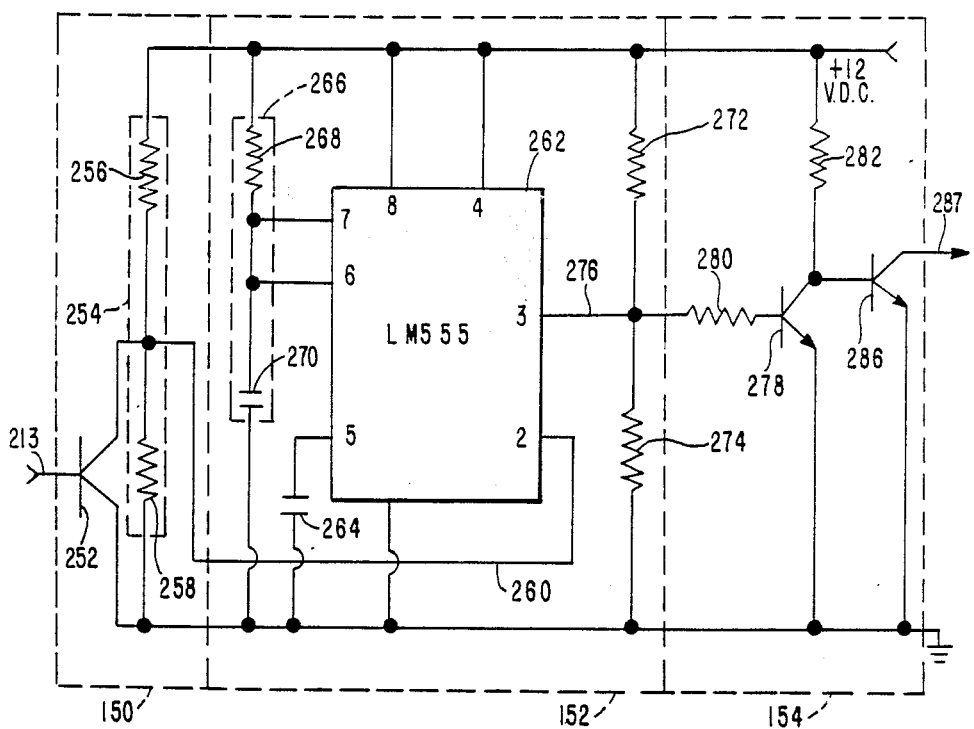
FIG. 7 is a circuit diagram of the off-hook detector, one-shot monostable multi-vibrator and solenoid driver as shown in FIG. 2.

Referring now to FIG. 7, the comparator isolator 144, via wire 213, is connected to the off-hook detector 150 at the base of switching transistor 252. The off-hook detector further includes a pull-up and divider circuit 254 having a pair of resistors 256, 258. The output from the off-hook detector 150 is applied along wire 260 to the one-shot monostable multi-vibrator 152. The multi-vibrator 152 is designed around a universal timer oscillator 262 having an interface circuit constructed of a filter capacitor 264, a timing circuit 266 constructed of a resistor 268 and a capacitor 270, a pull-up resistor 272, and a load matching resistor 274. The generated output pulse from the multi-vibrator 152 is applied along wire 276 to the solenoid driver 154 at the base of a voltage switching transistor 278. The solenoid driver 154 further includes a bias resistor 280, a pull-up resistor 282 and a current amplifier transistor 286. The output from the solenoid driver 154 is applied to interface 116 along wire 287.

Figure 3:
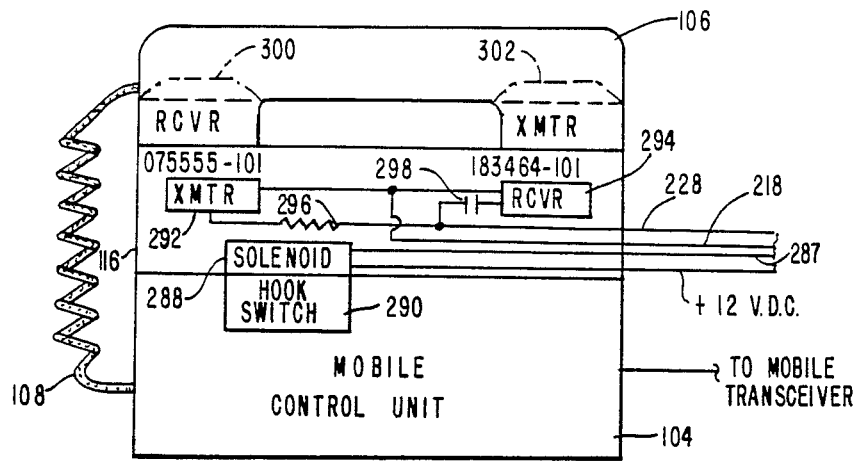
FIG. 3 is a block diagram showing, in greater detail, another interface as shown in FIG. 1.

Referring now to FIG. 3, the output pulse from the solenoid driver 154 is applied directly to a solenoid 288 for controlling the operation of a hook switch 290 provided as part of the mobile control unit 104. The interface 116, which is arranged between the mobile control unit 104 and wired handset 106, further includes an acoustic transmitter 292 and an acoustic receiver 294 which are connected to the comparator isolator 144 along output wires 218, 228 through one of a resistor 296 and a capacitor 298. The transmitter 292 is arranged underlying an acoustic receiver 300 within the wired handset 106, while the receiver 294 is arranged underlying an acoustic transmitter 302. In this manner, the interface 116 is acoustically coupled to the wired handset 106. However, it is contemplated that optical coupling or direct hard wire coupling is also possible.

The operation of the system 100 will now be described. With the system constructed and arranged in accordance with FIG. 1, an incoming mobile call is sensed by mobile transceiver 102. Upon sensing the incoming call, the mobile transceiver 102 grounds the horn alert wire 124, which in turn, energizes the relay 170 of the ring detector 134. In response to the +10 volts D.C. being applied by the ring detector 134, the oscillator 136 and ring amplifier 138 generate a 20 Hz+90 volts D.C. output along wires 140, 142 which is applied to the comparator isolator 144. As shown in FIG. 6, the switches 201 of the relay 200 are originally set so that the comparator isolator 144 applies the output of the ring amplifier 138, i.e., ring voltage, to the wireless transceiver/control unit 110 along output wires 140, 142 to cause ringing of the wireless handset 112 which is now located at a remote location. That is, the user has removed the wireless handset 112 from the wireless transceiver/control unit 110 and is at a location remote from the vehicle containing the system 100. As is conventional with a wireless telephone unit, the user, upon ringing of the wireless handset 112, activates an answer button which transmits a signal to the wireless transceiver/control unit 110 to terminate the ring voltage and to connect the wireless transceiver/control unit to a talk circuit.

In accordance with the present invention, the comparator isolator 144, via relay 200 and opto-isolator circuit 214 which functions as a switch when answer button is activated, senses the impedance change on output wires 140, 142 and switches their connection via switches 201 from the ring amplifier 138 to interface 116 along output wires 218, 228 via connector 148. At the same time, the comparator isolator 144, via switching transistor 212, produces an off-hook signal applied to the off-hook detector 150 along wire 313. The off-hook detector 150, upon turning on of switching transistor 252, initiates the start of a one-shot pulse from the multivibrator 152. The one-shot pulse from the multivibrator 152 turns on voltage switch transistor 278, which turns on current amplifier transistor 286, to produce an output voltage along wire 287 for energizing solenoid 288 within interface 116. The solenoid 288 is energized for the duration of the one-shot pulse. Activation of the solenoid 288, enables the conventional hook switch 290 provided within the mobile control unit 104 to cause the mobile control unit to answer the incoming call.

The incoming call is received by the wired handset 106 which is acoustically coupled to interface 116 by means of the matching receiver/transmitter 300, 292 and transmitter/receiver 302, 294". The user, now holding the wireless handset 112, can communicate from a remote location to the base station. That is, the incoming call is now received by the mobile transceiver 102, applied through mobile control unit 104 and handset 106 to the acoustically coupled interface 116. In turn, the interface 116 applies the call to interface 114 which in turn applies the call directly to the wireless transceiver/control unit 110 for transmission to the wireless handset 112. Upon termination of the call, the user activates the conventional standby switch on the wireless handset 112 which signals the wireless transceiver/control unit 110 with a disconnect signal. The comparator isolator 144, upon sensing the impedance change along wires 140, 142 reconnects the wireless transceiver/control unit to the ring amplifier 138 via switches 201. In addition, the mobile control unit 104 resets itself to the standard phone standby condition for receiving a new incoming call.

Although the invention herein has been described with reference to particular embodiments, it is to be understood that these embodiments are merely illustrative of the principles and applications of the present invention. For example, interfaces 114, 116 may be combined into a single interface arranged between the mobile control unit 104 and wired handset 106. It is therefore to be understood that numerous modifications may be made in the illustrative embodiments, and that other arrangements may be devised without departing from the spirit and scope of the present invention as defined by the appended claims.

What is claimed is:

1. Apparatus for interconnecting a wireless telephone unit and a mobile telephone unit, said mobile telephone unit having a handset and mobile control unit with said mobile control unit having an off-hook detector therein, said apparatus enabling communications initiated at said wireless telephone unit to be transmitted through said mobile control unit and to enable external communications directed to said mobile telephone unit to be received at said wireless telephone unit via said mobile control unit, said apparatus comprising:

first means for coupling signals to and receiving signals from a mobile telephone unit; and second means for interconnecting a wireless telephone unit to said first means, said first means including means for applying signals generated at said wireless telephone unit to said mobile telephone unit and for applying external signals received by said mobile telephone unit to said second means, said first and second means cooperating to enable communications initiated at said wireless telephone unit to be further transmitted through said mobile telephone unit and to enable external communications directed to said mobile telephone unit to be received at said wireless telephone unit.

2. Apparatus for interconnecting a wireless telephone unit and a mobile telephone unit to enable communications initiated at said wireless telephone unit to be further transmitted through said mobile telephone unit and to enable external communications directed to said mobile telephone unit to be received at said wireless telephone unit, said apparatus comprising:

first means for coupling signals to and receiving signals from a mobile telephone unit; and second means for interconnecting a wireless telephone unit to said first means, said first means including acoustic coupler means for applying signals generated at said wireless telephone unit to said mobile telephone unit and for applying external signals received by said mobile telephone unit to said second means.

3. A wireless telephone communications system for communicating with a base station from a wireless telephone unit through a mobile telephone unit, said mobile telephone unit having a mobile transceiver for transmitting and receiving communication signals to and from said base station, said wireless telephone communication system comprising:

means for directly coupling signals to and receiving signals from a mobile telephone unit; and means for interconnecting a wireless telephone unit to said means for directly coupling, said means for coupling including acoustic coupler means for applying signals generated at said wireless telephone unit to said mobile telephone unit and for applying external signals received by said mobile telephone unit to said means for interconnecting.

4. The apparatus according to claim 1 wherein said second means includes means for generating a ring detection signal when an incoming telephone call condition is detected by said mobile telephone unit.

5. The apparatus according to claim 4 additionally comprising means for applying said ring detection signal to said wireless telephone unit.

6. The apparatus according to claim 1 additionally comprising means responsive to an off-hook condition at said wireless telephone unit for causing said mobile telephone unit to assume an off-hook condition and for operatively coupling said wireless telephone unit to said first means.

7. The apparatus according to claim 6 wherein said means responsive senses impedance changes exhibited by said wireless telephone unit.

8. The apparatus according to claim 6 additionally comprising solenoid hook switch means, said solenoid hook switch means being selectively energized and de-energized by said means responsive to selectively place said mobile telephone unit in off-hook and on-hook conditions.

9. The apparatus according to claim 2 wherein said first means is configured to receive a handset of a mobile telephone therein and control the on-hook and off-hook condition of said mobile telephone.

10. A wireless telephone communications system for communicating with a base station from a wireless telephone unit through a mobile telephone unit, said mobile telephone unit having a handset and mobile control unit with said mobile control unit having an off-hook detector therein and said wireless telephone unit communicating with said base station through said mobile control unit, said mobile telephone unit having a mobile transceiver for transmitting and receiving communication signals to and from said base station, said wireless telephone communication system comprising:

means for directly coupling signals to and receiving signals from a mobile telephone unit; and means for interconnecting a wireless telephone unit to said means for directly coupling, said means for coupling including means for applying signals generated at said wireless telephone unit to said mobile telephone unit and for applying external signals received by said mobile telephone unit to said means for interconnecting, said means for coupling and said means for interconnecting cooperating to enable communications initiated at said wireless telephone unit to be transmitted to said base station through said mobile telephone unit and to enable external communications directed to said mobile telephone unit to be received at said wireless telephone unit via said mobile control unit.

11. The wireless telephone communications system according to claim 10 wherein said means for interconnecting includes means for generating a ring detection signal when an incoming telephone call condition is detected by said mobile telephone unit.

12. The wireless telephone communications system according to claim 11 additionally comprising means for applying said ring detection signal to said wireless telephone unit.

13. The wireless telephone communications system according to claim 11 additionally comprising means responsive to an off-hook condition at said wireless telephone unit for causing said mobile telephone unit to assume an off-hook condition and for operatively coupling said wireless telephone unit to said means for directly coupling.

14. The wireless telephone communications system according to claim 13 wherein said means responsive senses impedance changes exhibited by said wireless telephone unit.

15. The wireless telephone communications system according to claim 13 additionally comprising solenoid hook switch means, said solenoid hook switch means being selectively energized and de-energized by said means responsive to selectively place said mobile telephone unit in off-hook and on-hook conditions.

16. The wireless telephone communications system according to claim 3 wherein said means for coupling is configured to receive a handset of a mobile telephone therein and control the on-hook and off-hook condition of said mobile telephone.

* * * * *